United States Patent [19]

Martin

[11] 4,309,793
[45] Jan. 12, 1982

[54] SHELLFISH MEAT AND SHELL SEPARATION PROCESS AND APPARATUS

[76] Inventor: Roger C. Martin, 1392 Lenora Dr., Merritt Island, Fla. 32952

[21] Appl. No.: 124,344

[22] Filed: Feb. 25, 1980

[51] Int. Cl.³ .............................................. A22C 29/02
[52] U.S. Cl. .......................................... 17/46; 17/51; 17/53; 17/71
[58] Field of Search .................... 17/53, 51, 48, 46, 56

[56] References Cited

U.S. PATENT DOCUMENTS

| | | | |
|---|---|---|---|
| 1,011,378 | 12/1911 | Shaffer | 17/53 X |
| 2,608,716 | 9/1952 | Harris | 17/45 |
| 3,017,661 | 1/1962 | Zartman | 17/51 X |
| 3,203,034 | 8/1965 | Matzer et al. | 17/74 |
| 3,408,686 | 11/1968 | Stephenson | 17/71 |
| 3,722,035 | 3/1973 | Hanks | 17/48 |
| 3,779,281 | 11/1969 | Kikindai et al. | 210/44 |
| 3,988,805 | 11/1976 | Martin | 17/48 |

*Primary Examiner*—W. Abercrombie
*Attorney, Agent, or Firm*—Roger L. Martin

[57] ABSTRACT

An apparatus and process of treating a mixture of shellfish meat particles and shell halves is revealed and wherein the mixture is treated by elutriation in an elongated, narrow upright zone. At the upper end of the zone the meat particles are removed while at the lower end of the zone the shells are withdrawn. The shells gravitate through a region of the zone and where the water is agitated by a device for admitting air to the elutriation zone and which accelerates the shell movement toward the lower end of the treatment zone. The meat particles, on the other hand, pass through yet another region and which the passage is diminished by the admission of air so as to accelerate the upward movement of the particles toward a lateral meat discharge opening from the zone. Here the meat particles are assisted in their discharge through the opening by an appropriately positioned baffle. The shells are received in a conveyor containing receptacle and embodiments using a screw conveyor and a belt conveyor are illustrated.

17 Claims, 5 Drawing Figures

SHELLFISH MEAT AND SHELL SEPARATION PROCESS AND APPARATUS

BACKGROUND OF THE INVENTION

This invention relates to an apparatus and process for separating a mixture of meat and shell parts derived from shellfish of the mollusk or bivalve type, and more particularly, to an apparatus and process for separating the meat and shell parts by elutriation procedures.

Bivalve or mollusk type shellfish, such as clams, scallops, oysters and mussels are well known and the meat of such shellfish is much in demand by the purchasing public. The processing of such shellfish to recover the meat from the shell parts however, is expensive and, in some cases, the procedures followed produce a product which to many customers is unacceptable.

In the usual commercial practices that are followed in recovering the edible meat product from the raw shellfish, the bivalve is subjected to a cleaning process for removing the dirt and debris which accompanies its recovery from its water habitat. To open the shell and reduce the adherence of the meat particles to the shell halves, the bivalve is also usually subjected to a steam treatment procedure which sometimes follows but which may be carried out simultaneously with the cleaning procedure. Thereafter the opened bivalve in the more modern commercial practices is passed through an apparatus which is commonly referred to as a "sheller" and which basically serves to sever the bivalve into two shell halves or parts while also overcoming the adherence of the meat particles to the shell halves. The shell parts that are mixed with the meat particles derived from the sheller are mainly in the form of shell halves although the mixture also contains a small amount of shell bits that result from the breakage of the shells and shell halves during the handling thereof. There are various ways to separate the shell parts from the meat particles other than by hand, and one way which has been used in the past is to float the meat particles away from the shell parts through the use of a brine solution. Such procedures tend to produce a meat product which is heavily permeated by the brine solution and which is unacceptable to many customers. Yet other ways to separate the shell parts and meat particles is to accomplish the separation mechanically as through the use of screens or other foraminous equipment. Such equipment is bulky however and not only takes up quite a bit of space that is valuable, as for example when the apparatus is to be operated on board a ship, but is also expensive to run.

Among other procedures which have been advocated for separating the meat particles from the shell parts is one in which the mixture is subjected to flotation procedures and during which the meat particles are floated to the surface of the water through the use of air bubbles in a flotation tank while the shell halves and shell bits gravitate downwardly in the tank to a conveying device which transports the shell parts to the exterior of the flotation tank. This method of separating the meat particles from the mixture has the disadvantage among others that separate means are required to gather and withdraw the meat particles from the flotation tank. Such equipment also takes up an excess amount of floor space and is unsatisfactory for use on board ship because of the interference with the flotation procedure that is attributed to the ship motion.

STATEMENT OF THE INVENTION

The inventor has found that elutriation procedures are admirably suited for the separation and recovery of the shellfish meat particles from a mixture of the particles with the shell parts, and that the elutriation procedures are most practically and advantageously carried out on a commercial scale, both on board ship and at land based food processing sites, by maintaining a confined elongated, narrow and vertically extending zone in which the mixture is treated in accord with such procedures. The use of the elutriation procedures has the advantage that brine solutions can be avoided as well as the less efficient mechanical devices that frequently require separate equipment in order to separate the meat particles from both the shell halves and smaller shell bits. The use of a confined narrow, vertically extending treatment zone for carrying out the elutriation procedures has the further advantage that it avoids the use of large space consuming tanks and equipment and permits the procedures to be carried out in an elutriation zone that can be provided through the simple use of conventional pipe and conduit sections that are readily available on the market. The resulting apparatus is also admirably suited for installation on board ships where space is at a premium and the use of open tank facilities is intolerable.

The use of a confined elongated, narrow and vertically extending zone for carrying out the elutriation process is not without its problems, however. For one, the narrow cross section dimension of the elutriation zone has a tendency to limit the throughput of the apparatus in accord with the capabilities of the shells to gravitate downwardly in the confined zone against the upwardly flowing water. In this respect a valve or shell half of a shellfish has a tendency to gravitate downwardly through water in a position such that the edges of the shell are more or less in a horizontal plane. This, of course, provides the greatest resistance to downward movement through the elutriation zone. In accord with applicant's invention, this problem is overcome by agitating the upwardly flowing water in that region of the elutriation zone through which the shell halves gravitate to their discharge passage from the zone. The turbulent water movement resulting from the agitation upends the shell halves to a point at which the edges of the shell halves fall in a more or less vertical plane. In this position the resistance to gravitational movement is greatly reduced and the shells slice through the upwardly flowing water in an accelerated downward movement toward the shell discharge passage from the zone. In accord with certain aspects of the invention, this agitation of the upwardly flowing water in the region referred to is accomplished by admitting pressurized air to the region to agitate and thus cause the turbulent water conditions.

Yet another problem that arises in using the upright, narrow elutriation zone lies in discharging the meat particles from the zone. The upward water flow rate needed to separate the meat particles from the shell halves by elutriation procedures is so small that the water velocity at the meat particle discharge passage from the zone is barely sufficient to provide a weir type overflow through the passage. This, of course, makes it difficult for the meat particles to be withdrawn from the zone and consequently the meat particles tend to collect at the discharge passage. To overcome this problem, the applicant causes an increase in the velocity of the upward flowing water in that region of the zone which is above the region wherein the separation of the meat particles and shell parts transpire so as to increase the velocity of movement of the entrained meat particles toward the discharge passage from the zone. In accord with certain aspects of the invention, the accelerated upward movement of the water and meat particles is accomplished by causing a restriction in the passage for the fluid through the region by admitting pressurized air to the region in question. This has the effect of diminishing the cross sectional area for the passage of the water through the region in question and hence accelerates the upward movement of the water toward the discharge passage from the zone. Here in accord with certain aspects of the invention the inventor provides a baffle arrangement which tends to deflect the water and entrained meat particles laterally and through a lateral opening for discharging the meat particles from the zone.

In accord with certain aspects of the invention, the valves or shell halves are received from the elutriation zone in a suitable receptacle that is in communication with the zone and equipped with a conveyor for removing the shell parts from the apparatus through a discharge opening in the receptacle which is located above the discharge opening or passage from the zone for the separated meat particles. In accord with certain aspects, the conveyor can be of a belt type but for installations on board ship or other floating facilities, a screw type conveyor is contemplated.

A general object of the invention is to provide an improved apparatus and process for separating shellfish meat particles from a mixture of shell parts therewith. Yet another object is to provide an apparatus and process for separating such meat particles and shell parts by elutriation techniques. Still another object is to provide an apparatus and process for separating shellfish meat particles from such mixtures and which is relatively inexpensive to build and/or operate. Yet another object is to provide an apparatus of the kind contemplated and which takes up a relatively small amount of space in comparison to other apparatuses for effectuating the same type separation. Yet another object is to provide an apparatus of the kind contemplated and which is readily adapted for use on board ship or other floating facilities in that it takes up a relatively small amount of space to effectuate the desired meat particle separations and is relatively uninfluenced by the pitching and rolling motions experienced on board ship. A further objective is to provide an apparatus and process for separating meat particles and shell parts by improved elutriation techniques that facilitate a higher product throughput than would result in the absence of such improved techniques. Other objects will be apparent from the following disclosure contained herein.

BRIEF DESCRIPTION OF DRAWINGS

The novel features which are believed to be characteristic of this invention are set forth with particularity in the appended claims. The invention itself, however, both as to its organization and method of operation, together with further objects and advantages thereof, may best be understood by reference to the following descriptions taken in connection with the accompanying drawings, wherein:

GENERAL DESCRIPTION OF EMBODIMENT

Figure 3:
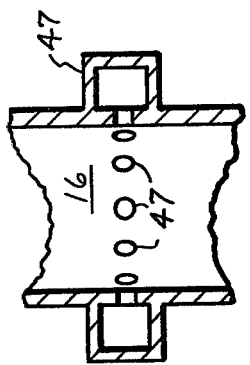
FIG. 3 is an enlarged sectional view taken generally along the Lines 3—3 of FIG. 1.
Figure 2:
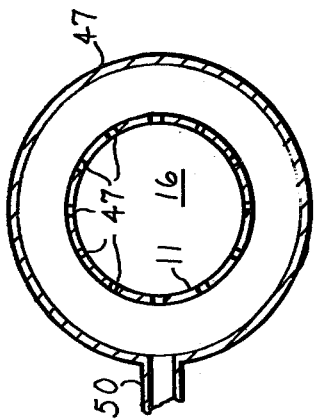
FIG. 2 is an enlarged horizontal view of certain parts of the apparatus as seen generally along the Lines 2—2 of FIG. 1.

Reference is first made to the apparatus embodying the principles of the invention as seen in FIGS. 1-4. Here, the apparatus for separating the meat particles and shell parts from a mixture thereof includes an elongated, vertically arranged conduit 11 that has a lateral wall 30 which defines a confined narrow, elongated and vertically extending elutriation zone 12 for treating the mixture of meat particles and shell parts by elutriation procedures. For most shellfish, the zone is preferably cylindrical in shape and of the order of magnitude of from 4 inches to 12 inches in diameter. The apparatus has yet another conduit 13 and which is used to deliver the mixture of meat particles and shell parts to the treatment zone 12. Apparatus 10 also has a pair of pneumatic devices 14 and 15 that are respectively provided to agitate and increase the water flow rate in separate regions of the zone 12 and which are designated at 16 and 17. The apparatus 10 also has a tank or receptacle 38 for receiving the shell parts that are separated in zone 12 and tank 38 houses a conveyor 40 for conveying the separated shell parts to an opening 39 for discharging the shell parts from the apparatus.

Figure 1:
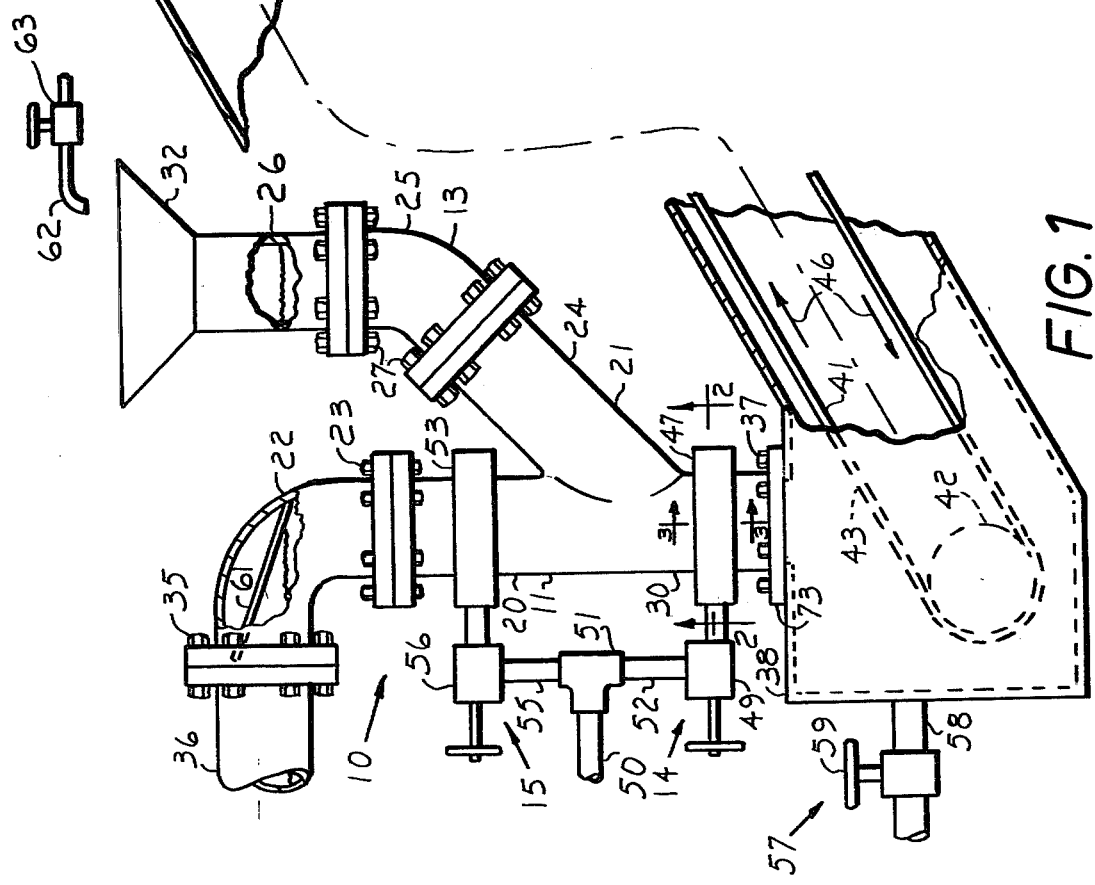
FIG. 1 is a side elevational view of an apparatus embodying the principles of the invention with certain parts being broken away to facilitate a better understanding of other parts of the apparatus.
Figure 4:
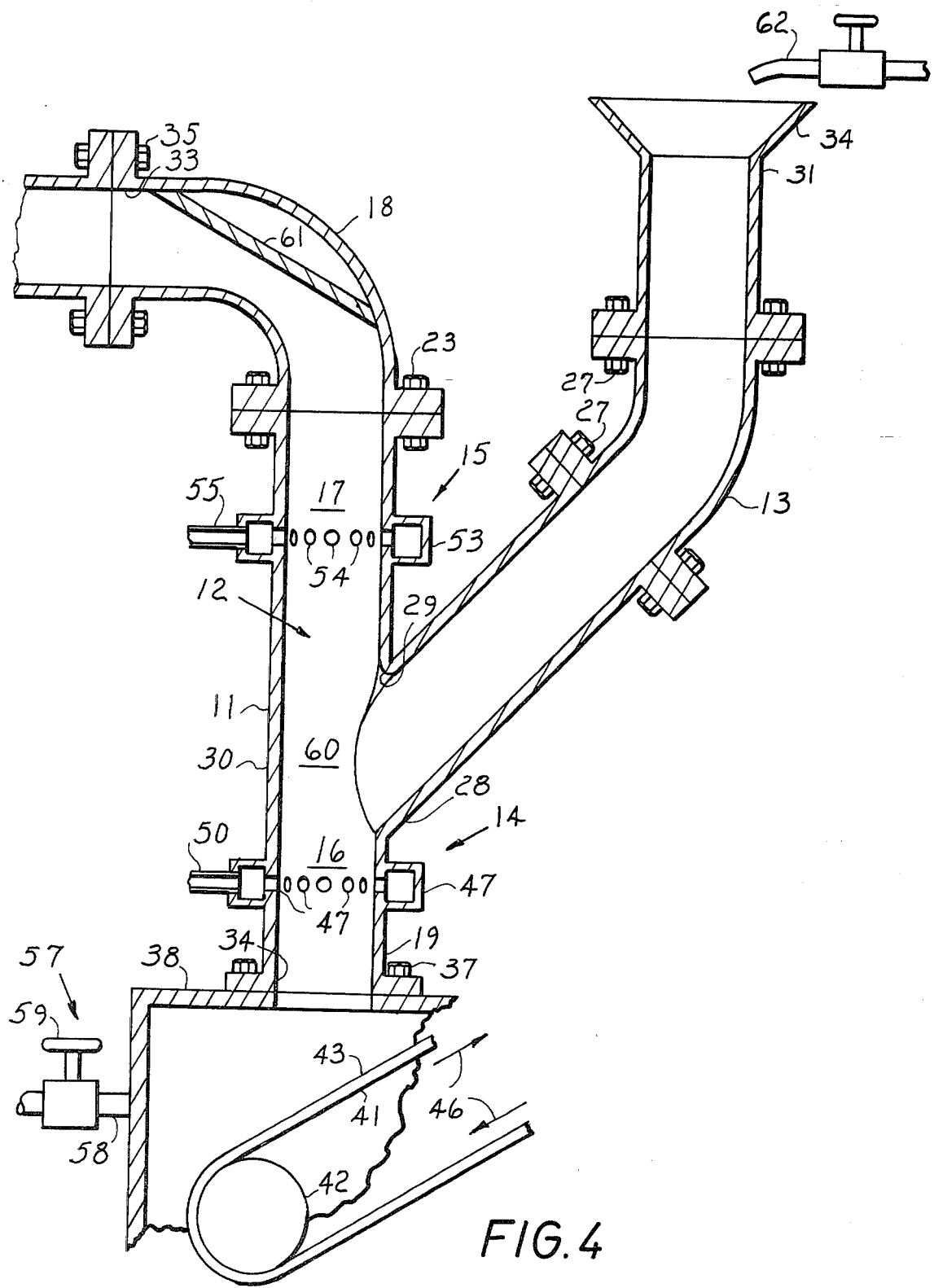
FIG. 4 is an enlarged vertical sectional view taken generally along a vertical plane through the middle of the apparatus seen in FIG. 1 and with certain parts broken away and others removed to facilitate a better understanding of the procedures followed in accord with certain processing aspects of the invention.

As seen in FIG. 4, conduit 11 has upper and lower ends 18 and 19 and is formed in the illustrated embodiment by an upright portion 20 of a conventional pipe lateral 21 and a pipe elbow 22 which is bolted to the upright portion 20 by flange bolts 23. Conduit 13, on the other hand, is formed by the inclined lateral portion 24 of the pipe lateral 21 and an elbow 25 and pipe section 26 that are joined together, as seen in FIGS. 1 and 4 by flange bolts 27. At its lower end 28, conduit 13 communicates with the elutriation zone 12 through an opening 29 in the lateral wall 30 of the conduit 11 while at its upper end 31, the conduit 13 communicates with a hopper 32 for receiving the mixture to be treated in the apparatus 10.

The zone confining lateral wall 30 extends between the upper and lower ends 18 and 19 of the zone forming conduit 11, and at its upper end 18, the conduit has a lateral opening or passage 33 for passing the separated meat particles from zone 12 to a pipe section 36. Here, the conduit elbow 22 is bolted by flange bolts 35 to the pipe section 36. As thus attached to the elbow 22, section 36 communicates with the zone 12 through the upper end passage 33 and provides a means for receiving and recovering the separated shellfish meat particles from the treatment zone 12 of the apparatus 10.

At its lower end 19, conduit 11 has an opening or passage 34 for passing the shell parts from the treatment zone 12. Here, the pipe lateral 21 is bolted by flange bolts 37 to a receptacle or tank component 38 of the apparatus 10. Receptacle 38 communicates with the treatment zone 12 through the lower end opening or passage 34 and provides a means for receiving the separated shell parts as they are withdrawn from the zone by gravitational forces.

Receptacle 38 houses a conveyor 40 that provides a means for conveying the shell parts received from zone 12 to a discharge opening or passage 39 through which the shell parts are discharged from apparatus 10. Opening 39 is located above the upper end opening 33 in conduit 11 so that the hydrostatic head at the meat discharge passage 33 is balanced by the hydrostatic head maintained in tank 38. Conveyor 40 has an endless belt 41 which is trained over an idler roll 42 at the submerged or lower end 43 of the conveyor and also over a driven roll 44 at the upper end 45 of the conveyor. The lower end 43 of conveyor 40 underlies the shell parts discharge opening 34 from zone 12 so that the shell parts received in the tank fall on the lower end of the conveyor belt, and the belt 41, during use of the apparatus, is driven in the direction of arrows 46 so as to carry the received shell parts upwardly on the inclined belt and to the discharge opening 39 of the receptacle 38.

The device 14 for agitating the water in region 16 of zone 12 includes an annular plenum chamber 47 that surrounds the upright portion 20 of pipe lateral 21 between the lateral opening 29 and the lower end 19 of conduit 11. Here, the lateral wall 30 of conduit 11 has a plurality of orifice forming openings 48 that are circumferentially spaced apart around the lateral side wall 30 of conduit 11. These orifices 48 communicate with the plenum chamber 47 at the outside of wall 30 and with the region 16 of zone 12 within the conduit the plenum chamber 47 is connected through a control valve component 49 of device 14 to a compressed or pressurized air source that is tapped by pipe 50 and distributed to the plenum chamber 47 through pipe tee 51 and the control valve containing pipe section designated at 52. Control valve 49 may be manipulated to provide pressurized air to chamber 47 and which in turn delivers the air through the orifices 48 to region 16 for purposes of agitating the water in the region to provide the turbulent conditions that upend the shell halves.

The device 15 for increasing the upward water flow rate in region 17 of zone 12 is similar to device 14. It includes an annular plenum chamber 53 that in this case surrounds the conduit wall 30 between the lateral wall opening 29 and the upper end opening 33 in the conduit 11. Here, the lateral wall 30 is again provided with a plurality of circumferentially spaced apart openings 54 that communicate through the lateral side wall 30 with the zone region 17 and exteriorly of the wall with the plenum chamber 53. Chamber 53 is connected to the pressurized source that is tapped by pipe 50, by means of a pipe 55 which connects with pipe 50 through tee 51 and contains the control valve 56. Control valve 56 may be manipulated to admit pressurized air to plenum chamber 53 and this in turn feeds the pressurized air through the orifices to region 17 and where it serves to constrict the size of the flow passage of the water through the zone and thereby accelerates the upward flow rate of the water toward the meat discharge opening 33.

The device for delivering the water to the zone 12 is shown in the form of a pipe 58 which through a control valve 59 is connected to a pressurized source of water, not shown. Pipe 58 communicates with the interior of tank 38 and thus communicates with the zone 12 through the discharge passage 34 for the shell parts. The region of zone 12 in which the meat particles and shell parts are separated from each other is designated at 60 and as seen in FIG. 4 lies in the space between the lower and upper regions 16 and 17. Here, in region 16, device 57 serves to establish an upward water flow rate at and across the lateral wall opening 29 which is sufficient to entrain and carry the delivered meat particles upwardly toward the upper end opening 33 and thus into region 17 while nevertheless permitting the delivered shell parts to gravitate downwardly toward the discharge opening 34 and into the region 16.

In preparing the apparatus 10 for continuous operation, the water control valve 59 of device 57 is first manipulated to fill the tank 38 and conduits 11 and 13 to the point at which conduit 11 is overflowing into pipe section 36 through the meat discharge opening 33. When this happens, the water level in tank 38 is somewhat below the shell part discharge opening 39 while the water level in the delivery conduit 13 is below the lower end of the hopper 32. With the treatment zone 12 thus filled with water and overflowing, the valve 59 is now manipulated to continuously deliver water to the zone through opening 34 in amounts which are sufficient in the separating region 60 to separate by elutriation the mixture of meat particles and shell parts of the type shellfish contemplated for treatment in the apparatus. This can be readily ascertained and determined empirically and will be an upward flow rate at which the meat particles of the mixture fed to the zone are entrained and carried upwardly toward the lateral opening 33 while permitting the shell halves to gravitate downwardly toward the discharge opening 34.

With the upward flow of water regulated to effectuate separation of the meat particles from the shell parts of a mixture thereof, the control valve 49 of the pneumatic device 14 for agitating the water in zone 16 is manipulated to continuously discharge pressurized air into the lower region 16 through orifices 47. The amount of air admitted to continuously agitate the water in region 16 so as to provide a turbulent water condition that causes the shell halves to be upended and resulting in an accelerated movement toward the lower end opening 34 can be ascertained empirically as by observing the time required at various control valve settings under otherwise nonvarying conditions for standardized shell halves to pass from the hopper 32 to the discharge opening 39 of tank 38. As previously indicated, most of the shell parts are shell halves which in gravitating downwardly in nonturbulent waters normally assume a position at which the edges of the shell halves fall in a generally horizontal plane. When the shell halves are in such a position, the downward gravitational movement of the shell parts is restricted whereas by agitating the water to provide a turbulent condition, the shell halves are upended so that the edges are generally oriented in a vertical plane that enables the shell halves to slice down through the water with less resistance and thus pass more rapidly through the turbulent region and into the tank 38.

With the control valves of devices 14 and 57 now adjusted, the control valve 56 for the device 15 for increasing the upward flow rate of the water in zone 17 is adjusted so as to admit the pressurized air through orifices 54. This admission of the pressurized air of course constricts the flow path through region 17 and thereby accelerates the upward movement of the water through the regions. This in turn accelerates the upward movement of the meat particles so that the water in the entrained meat particles strike the inclined baffle 61 that is mounted in elbow 22 and are deflected laterally thereby through opening 33 and into the pipe section 36 for receiving and recovering the meat particles from the zone. In general, the more pressurized air that is delivered to zone 17 through orifices 54 the greater the restriction of the fluid flow path through the region 17 and hence the faster the movement of the water and meat particles at the time they strike baffle 61.

At this point it should be pointed out that the amount of air which is continuously delivered to zone 16 through the operation of device 14 should only be sufficient to cause a reduction in the residence time of the shells in the apparatus as compared to the residence time of the shells when the air is not admitted to region 16 and without unduly increasing the upward velocity of the water in the zone to the point at which there is excess of entrainment of the shell bits. Thus, only sufficient air is needed to upend the shell parts. Any excess will have a tendency to be counterproductive of the desired result and will tend to cause entrainment and an unnecessary carryover of some of the shell bits with the meat particles.

In carrying out the process for recovering the meat particles from a mixture of the particles with their shell parts, the mixture is normally received in hopper 32 and continuously washed down and into conduit 13 by means of a water spray that is delivered to the mixture as it enters the conduit through water nozzle 62. Here, in conduit 13, the components of the mixture gravitate downwardly to the lower end 28 of the conduit 13 and pass into the treatment zone 12 through opening 29. Upon encountering the upward flow of water in zone 16 during the normal operation of the apparatus, the meat particles become entrained and are carried upwardly into region 17. Here the accelerated movement of the rising water caused by the admission of the pressurized air through orifices 54 of device 15, causes the separated meat particles to move rapidly in an upward direction and to the point that the water and meat particles are deflected by a baffle 61 into the recovery conduit section 36 through the lateral opening 33.

The shell parts of the mixture delivered to separation zone 60 upon encountering the upward flow of water gravitate downwardly and countercurrent to the movement of the water through region 16. As this happens, the water is being agitated by the delivery of the pressurized air through orifices 47 into region 16 and the shell halves are upended so that they rapidly fall through the zone 16 and thence through the discharge opening 34 at the bottom of the conduit. Here the shell halves fall onto the belt 41 of conveyor 40 and are conveyed upwardly in tank 38 to the point at which they fall from the conveyor and are discharged from the tank and apparatus through opening 39. The small shell bits that are delivered to the zone 60 with the shell halves, in the absence of excessive admission of air through orifices 47 also gravitate downwardly through region 16 and to the lower end of the conveyor belt 43.

Figure 5:
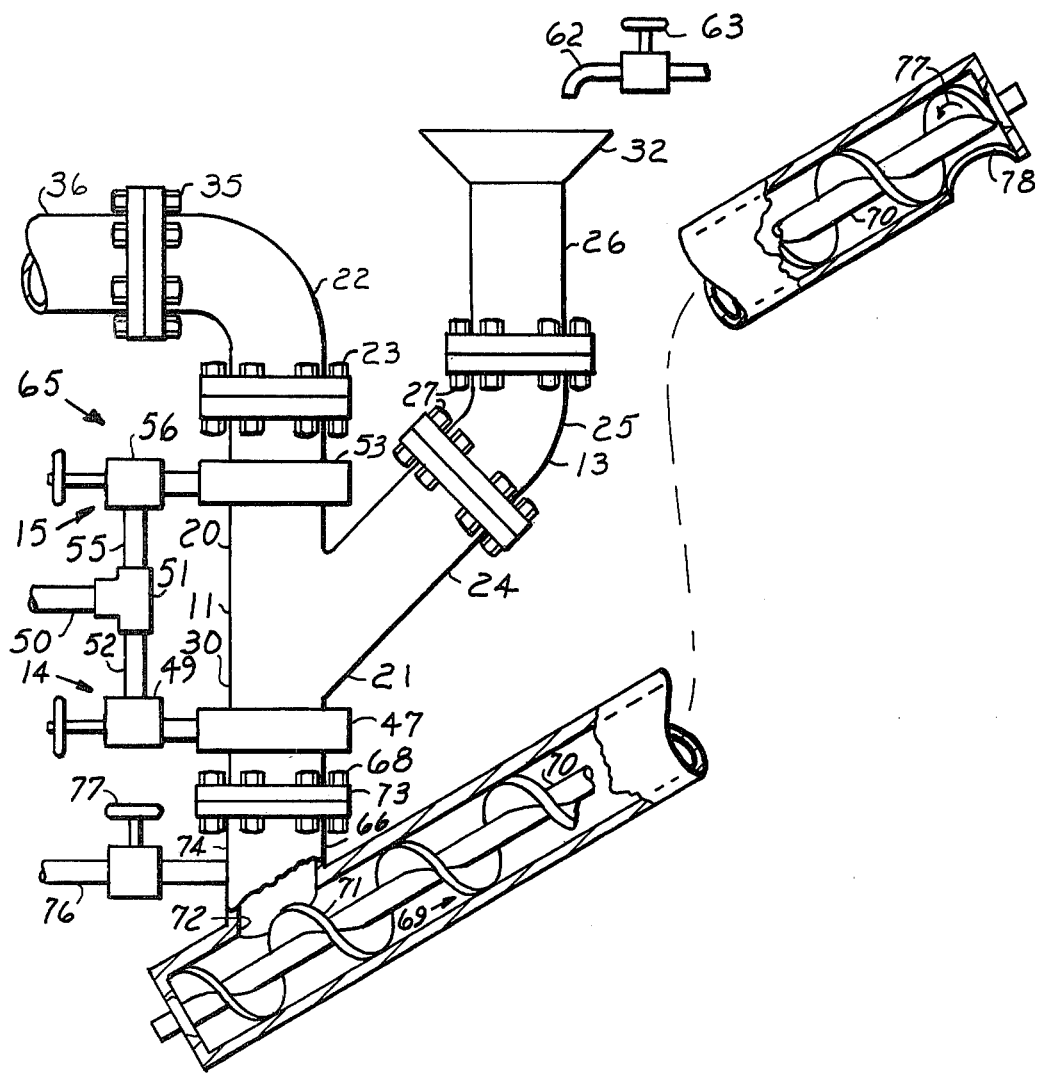
FIG. 5 is a side elevational view of another apparatus embodying the principles of the invention and which for most respects is identical to the embodiment shown in FIG. 1 except for that portion of the apparatus which receives and conveys the separated shell parts to a point of discharge from the apparatus.

Reference is now made to the embodiment shown in FIG. 5 and wherein like parts are designated with the same numerals used in the description of the embodiment contemplated by FIGS. 1–4. Here, the apparatus is generally designated at 65 and includes the elongated, vertically arranged conduit 11 described with respect to the prior embodiment and which is formed by the upright portion 20 of conduit lateral 21 and the elbow 22 bolted thereto by means of flange bolts 23. The other conduit 13 for delivering the mixture of shellfish meat particles from the shell parts to conduit 11 is again made up of the lateral portion 24 of pipe lateral 21, and elbow 25 and a pipe section 26 that are bolted together with flange bolts 27. Pipe section 26 is also connected to the hopper 32 as in the prior embodiment.

Apparatus 65 also has the device 14 for use in agitating the water in the treatment zone and is again made up of a plenum chamber 47, control valve 49 containing pipe section 52 and which is connected to the pressurized source through tee 51 and pipe 50. The device 15 for accelerating the upward flow of water in the treatment zone again has a plenum chamber 53 and a control valve 56 containing pipe section 55 which is connected to the pressurized air source through tee 51 and pipe 50.

The main difference between the embodiment shown in FIG. 5 and that shown in FIGS. 1–4 lies in the receptacle and conveyor used for receiving and conveying the shell parts after they are discharged from the treatment zone of conduit 11. With reference to the embodiment shown in FIG. 5, the lower end 19 of conduit 11 is bolted to an upright pipe section 66 of an elongated and inclined cylindrical receptacle 67 as by means of flange bolts 68. Receptacle 67 serves as the housing for a screw conveyor 69 which is provided with a driven screw 70. Pipe section 66 provides a lower extension to the lateral wall 30 of conduit 11 and as such, the opening 72 at the lower end of the conduit is downwardly offset from the bottom flange 73 of pipe lateral 21 and overlies the lower end 71 of the screw conveyor. Under such circumstances, the water is admitted to the treatment zone through the lower extension 74 of lateral wall 30 by means of a pipe 75 that is connected to a pressurized source of water through control valve 76. During the operation of apparatus 65, the separated shell parts fall through the opening 72 at the bottom of the extension 74 of lateral side wall 30 and into the receptacle 67. Here, as the shell parts are withdrawn from the opening 72, they are picked up by the screw 70 as it is driven in the direction of arrow 77 and conveyed upwardly to the point at which they discharge from the receptacle to discharge opening 78. This discharge opening 78 is again located above the meat particle discharge opening so that the water head in receptacle 67 balances that in conduit 11.

Except for the operation of the screw, the operation of apparatus 65 is like that previously described with respect to the apparatus 10 shown in FIGS. 1–4. The use of a screw type conveyor is preferred for ship board operations because the screws serve to dampen fluid movement caused in the shell receptacle by ship motion. Wave motion and water surges due to ship motion causes hydrostatic pressure differences and this adversely interferes with the efficiency of the treatment accorded the mixture in the apparatus.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. An apparatus for separating shellfish meat particles from a mixture of shell halves therewith comprising an elongated, vertically arranged first conduit that has upper and lower ends, a lateral wall which extends between the ends and defines an elongated narrow zone for treating the mixture by elutriation to separate the meat particles and shell halves thereof, an opening at said lower end for passing the separated shell halves from the zone, an opening at said upper end for passing the separated meat particles from the zone, and an opening in the lateral wall which is offset from and located between the openings at said upper and lower ends, a second conduit communicating with the zone through the lateral wall opening for delivering the mixture of meat particles and shell halves to said zone, a controllable device communicating with the zone below said lateral wall opening for delivering water to said zone and therein establishing an upward water flow rate at the lateral wall opening which is sufficient to entrain and carry the delivered meat particles upwardly toward the upper end opening while permitting the delivered shell halves to gravitate downwardly toward the lower end opening, another controllable device for agitating the water in a first region of the zone which is between said lateral wall opening and said lower end opening to thereby upend the delivered shell halves in the first region and thereby accelerate the downward movement thereof toward said lower end opening, another controllable device for increasing the upward water flow rate in a second region of the zone which is between said lateral wall openings and said upper end opening to accelerate the upward movement of the meat particles in the second region toward said upper end opening, and means communicating with the zone through said upper end opening for receiving the separated meat particles passing therethrough.

2. An apparatus for separating shellfish meat particles from a mixture of shell halves therewith in accord with claim 1 comprising a receptacle which communicates with the zone through said lower end opening for receiving the separated shell halves passing therethrough and which has a discharge opening that is located above said upper end opening, and means in the receptacle for conveying the received shell halves to said discharge opening.

3. An apparatus for separating shellfish meat particles from a mixture of shell halves therewith in accord with claim 2 wherein the conveying means has a lower end and includes a driven endless belt which at the lower end of the conveying means underlies said lower end opening.

4. An apparatus for separating shellfish meat particles from a mixture of shell halves therewith in accord with claim 2 wherein the conveying means includes a driven screw member having a lower end that underlies said lower end opening.

5. An apparatus for separating shellfish meat particles from a mixture of shell halves therewith in accord with claim 1 wherein the controllable water delivering device comprises a conduit which is connected to a water source and communicates with the zone through said lower end opening.

6. An apparatus for separating shellfish meat particles from a mixture of shell halves therewith in accord with claim 1 wherein the controllable water delivering device comprises a conduit which is connected to a water source and communicates with the zone through said lateral wall.

7. An apparatus for separating shellfish meat particles from a mixture of shell halves therewith in accord with claim 1 wherein the controllable water agitating device comprises orifice means connected to a pressurized air source and communicating with the zone through said lateral wall.

8. An apparatus for separating shellfish meat particles from a mixture of shell halves therewith in accord with claim 1 wherein the controllable upward water flow rate increasing device comprises orifice means connected to a pressurized air source and communicating with the zone through said lateral wall.

9. An apparatus for separating shellfish meat particles from a mixture of shell halves therewith in accord with claim 2 wherein the controllable water agitating device comprises orifice means connected to a pressurized air source and communicating with the zone through said lateral wall, and wherein the controllable upward water flow rate increasing device comprises orifice means connected to said pressurized air source and communicating with the zone through said lateral wall.

10. An apparatus for separating shellfish meat particles from a mixture of shell halves therewith in accord with claim 9 wherein the conveying means has a lower end and includes a driven endless belt which at the lower end of the conveying means underlies said lower end opening.

11. An apparatus for separating shellfish meat particles from a mixture of shell halves therewith in accord with claim 1 wherein said upper end opening is a lateral opening, wherein said apparatus comprises an inclined baffle at said upper end for laterally deflecting the upwardly moving meat particles thereat through the lateral opening at said upper end, and wherein the controllable upward water flow rate increasing device comprises orifice means connected to a pressurized air source and communicating with the zone through said lateral wall.

12. A process for separating shellfish meat particles from a mixture of shell halves therewith comprising maintaining a confined elongated, narrow, vertically extending treatment zone having upper and lower end passages that communicate with the exterior of the zone, vertically spaced apart upper and lower regions that are located between said passages, and a separating region that is located in the space between said upper and lower regions, delivering the mixture of meat particles and shell halves to said separating region, continuously passing water upwardly through said zone and at a flow rate which is sufficient in the separating region to entrain and carry the delivered meat particles upwardly into said upper region while permitting the delivered shell halves to gravitate downwardly into said lower region, continuously agitating the water in said lower region to upend and thereby accelerate the downward gravitational movement toward the lower end passage therebelow of the shell halves in said lower region, receiving the shell halves from the treatment zone through said lower end passage, increasing the upward flow rate of water in said upper region to thereby accelerate the upward movement toward the upper end passage of the separated meat particles entrained thereby, and receiving the meat particles from the treatment zone through said upper end passage.

13. A process for separating shellfish meat particles from a mixture of shell halves therewith in accord with claim 12 wherein at least a portion of the upwardly passing water in the zone is continuously admitted thereto through said lower end passage.

14. A process for separating shellfish meat particles from a mixture of shell halves therewith in accord with claim 12 wherein at least a portion of the upwardly passing water in the zone is continuously admitted to the zone below the separating region thereof.

15. A process for separating shellfish meat particles from a mixture of shell halves therewith in accord with claim 12 wherein the continuous agitation of the water in said lower region is accomplished by continuously discharging pressurized air into said lower region.

16. A process for separating shellfish meat particles from a mixture of shell halves therewith in accord with claim 12 wherein the upward flow of water is accelerated in said upper region by continuously discharging pressurized air into said upper region.

17. A process for separating shellfish meat particles from a mixture of shell halves therewith in accord with claim 12 comprising continuously admitting water to the zone through said lower passage, continuously discharging pressurized air into said lower region to thereby agitate the water therein, and continuously discharging pressurized air into said upper region to thereby increase the upward flow rate of the water therein.

* * * * *